Figure 1:
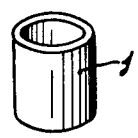

July 17, 1956

P. C. VAN DER WILLIGEN 2,755,164

SLAG-FORMING BODY FOR USE IN BOLT
WELDING AND METHOD OF MAKING SAME
Filed July 15, 1952

INVENTOR
PAUL CHRISTIAAN VAN DER WILLIGEN
BY
AGENT

United States Patent Office 2,755,164
Patented July 17, 1956

2,755,164

SLAG-FORMING BODY FOR USE IN BOLT WELDING AND METHOD OF MAKING SAME

Paul Christiaan van der Willigen, Eindhoven, Netherlands, assignor to Hartford National Bank and Trust Company, Hartford, Conn., as trustee Application July 15, 1952, Serial No. 298,968

Claims priority, application Netherlands August 25, 1951

4 Claims. (Cl. 148—23)

It has been suggested in bolt welding to utilize a body which is provided between the two work-pieces to be welded together and which fuses wholly or in part due to the action of the flame arc. The body must be of a composition such that during melting a slag is prdouced which protects the molten metal against action of the atmosphere, so that a weld of good quality is obtained. The shape of the body is frequently chosen to be such that it tightly surrounds the extremity of the bolt to be welded. It has been suggested for bolt welding of iron workpieces to give the bodies a composition such that the composition of the slag formed during welding substantially corresponds to a slag obtained during the welding of a welding rod of the low-hydrogen type. The coatings of such welding rods usually comprise calcium carbonate, calcium fluoride, reducing metal powders being powdered iron alloys capable of reducing iron oxide in a flame arc and clay as slag-forming components.

Consequently, a mixture containing the said substances has been used for manufacturing the above-mentioned bodies. However, it is to be noted that, in order to avoid as much as possible the development of gas during welding, the bodies before use are heated to a high temperature (for example 800° C.), so that calcium carbonate is converted into calcium oxide and the coherence of the body is improved by the sintering process which occurs during heating Consequently, the bodies used in bolt welding are constituted by a sintered mass consisting of a mixture of calcium oxide, calcium fluoride, reducing metal powders being powdered iron alloys capable of reducing iron oxide in a flame arc and clay. However, it has been found that the said slag-forming bodies do not always yield a weld of high quality. In many cases the weld is porous, so that the rigidity of the welded joint is detrimentally affected.

However, it has surprisingly been found, that, if the mixture from which the slag-forming body is manufactured contains magnesium compounds, porosity occurs to a considerably smaller extent or does not occur at all.

It may be mentioned here that magnesium compounds have previously been used in coatings of welding rods and that the art in most cases refers to the coating of the low-hydrogen type of welding rod as substantially containing fluorides and carbonates of the alkaline-earth metals, in certain cases it being stated furthermore that, as an alternative, corresponding magnesium compounds may be used. Nevertheless, in practice calcium fluoride and calcium carbonate almost exclusively are used in the coating of this type of welding rod so that it was by no means evident to manufacture slag-forming bodies according to the invention with the use of magnesium compounds.

The said body may most suitably be made by a mixture as above described in which calcium carbonate is substituted for either by magnesium carbonate or magnesium oxide. Furthermore, calcium fluoride in this mixture may be substituted for by magnesium fluoride, or a suitable magnesium compound may be added to the above-mentioned mixture.

The most suitable quality of magnesium compounds is from 15 to 45% by weight of the slag-forming part of the mixture, said magnesium compound being calculated as magnesium oxide.

A slag-forming body according to the invention consists for example, of a mixture moulded into the desired shape and subsequently sintered, which mixture is composed of 30 parts of magnesium oxide, 25 parts of calcium fluoride, 5 parts of ferro-manganese (80% of Mn), 5 parts of ferro-silicon (45% of Si) and 35 parts of bentonite.

For manufacturing the body, the said substances in the pulverulent state are intimately mixed with 25 parts of water, subsequently moulded into a body of the desired shape and then dried and degassed and sintered in a reducing atmosphere at 800° C.

Similarly, such a slag-forming body may be constituted by a mixture of 16 parts of magnesium oxide, 32 parts of magnesium fluoride, 12 parts of ferro-manganese (80% of Mn), 8 parts of ferro-silicon (45% of Si), and 32 parts of kaoline.

If a certain conductivity of the slag-forming body according to the invention is desired in order to ignite the flame arc with the use of this body, the powders before moulding are mixed with an approximately equal amount of powdery iron.

Figure 2:
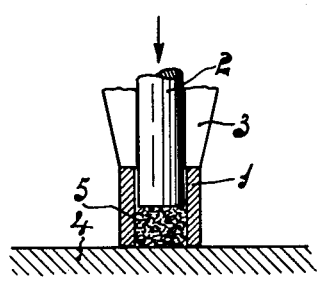

In the accompanying drawing Figure 1 shows a body according to the invention in the shape of a short tube. Figure 2 shows a cross-section of this body 1 with a metal bolt 2 closely fitting into the opening of the tube-shaped body 1. In welding the bolt 2 is urged towards the metal surface 4 but it is prevented from penetrating over a predetermined depth by a device 3 which is temporarily attached to the bolt 2 and may be removed therefrom when the weld is completed. An electric arc is ignited between the end of the bolt 2 and the metal surface 4 by means of a wad of metal filings 5 inserted into the open end of the tube 1. The heat of the arc melts metal on the surface 4 and at the end of the bolt 2 and also melts and deforms the tube shaped body 1 so that after a predetermined time this body can no longer prevent the bolt 2 from contacting the surface 4 and thus extinguish the arc and complete the weld. It must be pointed out that there are other methods known for welding a bolt to a metal surface and therefore a slag-forming body according to the invention may be otherwise shaped to suit these methods without departing from the scope of the invention.

What I claim is:

1. A slag-forming body for use in bolt welding of work pieces composed substantially of iron and consisting of a sintered mixture of 30% by weight of magnesium oxide, 25% by weight of calcium fluoride, 5% by weight of ferro-manganese, 5% by weight of ferro-silicon and 35% by weight of bentonite.

2. A slag-forming body for use in bolt welding of work pieces composed substantially of iron and consisting of a sintered mixture of 16% by weight of magnesium oxide, 32% by weight of magnesium fluoride, 12% by weight of ferro-manganese, 8% by weight of ferro-silicon, and 32% by weight of kaoline.

3. A method of manufacturing a slag-forming body containing a sintered mass of magnesium oxide of 15% to 45% of the body, reducing metal powders in the form of powdered iron alloys selected from the group consisting of ferro-manganese and ferro-silicon and constituting about 10% to 20% of the body, clay constituting about 32% of the body and the remainder of calcium compounds; comprising the steps of mixing said mass with water, molding said mass into a body of desired shape, drying and degassing said body by heating said body to a temperature at which said mass sinters.

4. A slag-forming body for use in bolt-welding of work pieces comprising a sintered mass of an oxide and a fluoride of calcium and magnesium, metals capable of reducing iron oxide in a flame arc, and clay, said magnesium compounds constituting from 15% to 45% of the body, said metals being in the form of powdered iron alloys selected from the group consisting of ferromanganese and ferro-silicon and constituting about 10% to 20% of the body, said clay constituting approximately 32% of the body, and the remainder of calcium compounds.

References Cited in the file of this patent

UNITED STATES PATENTS

| | | |
|---|---|---|
| 2,021,628 | Larson | Nov. 19, 1935 |
| 2,282,175 | Emerson | May 5, 1942 |
| 2,396,604 | Reimers | Mar. 12, 1946 |
| 2,435,504 | Mathias | Feb. 3, 1948 |
| 2,552,105 | Miller | May 8, 1951 |
| 2,587,251 | Willigen | Feb. 26, 1952 |